US007840951B1

(12) United States Patent
Wright et al.

(10) Patent No.: US 7,840,951 B1
(45) Date of Patent: Nov. 23, 2010

(54) REDUCING THE OVERHEAD INVOLVED IN EXECUTING NATIVE CODE IN A VIRTUAL MACHINE THROUGH BINARY REOPTIMIZATION

(75) Inventors: Gregory M. Wright, Mountain View, CA (US); Mario I. Wolczko, San Carlos, CA (US); Matthew L. Seidl, Longmont, CO (US)

(73) Assignee: Oracle America, Inc., Redwood Shores, CA (US)

( * ) Notice: Subject to any disclaimer, the term of this patent is extended or adjusted under 35 U.S.C. 154(b) by 1200 days.

(21) Appl. No.: 10/646,309

(22) Filed: Aug. 22, 2003

(51) Int. Cl.
    *G06F 9/45* (2006.01)
(52) U.S. Cl. .................. 717/152; 717/146; 717/147; 717/148; 717/151
(58) Field of Classification Search ......... 717/146–148, 717/151–161
    See application file for complete search history.

(56) References Cited

U.S. PATENT DOCUMENTS

| | | | | |
|---|---|---|---|---|
| 5,491,821 | A * | 2/1996 | Kilis ........................... | 717/146 |
| 5,805,899 | A * | 9/1998 | Evans et al. ................. | 717/170 |
| 5,999,732 | A * | 12/1999 | Bak et al. .................... | 717/148 |
| 6,151,701 | A * | 11/2000 | Humphreys et al. ......... | 717/130 |
| 6,289,506 | B1 * | 9/2001 | Kwong et al. ............... | 717/148 |
| 6,412,107 | B1 * | 6/2002 | Cyran et al. ................. | 717/148 |
| 6,412,108 | B1 * | 6/2002 | Blandy et al. ............... | 717/152 |
| 6,412,109 | B1 * | 6/2002 | Ghosh ........................ | 717/155 |
| 6,513,156 | B2 * | 1/2003 | Bak et al. .................... | 717/151 |
| 6,662,358 | B1 * | 12/2003 | Berry et al. ................. | 717/128 |
| 6,910,205 | B2 * | 6/2005 | Bak et al. .................... | 717/151 |
| 7,032,216 | B1 * | 4/2006 | Nizhegorodov ............. | 717/152 |
| 7,150,012 | B2 * | 12/2006 | Hill ............................ | 717/158 |

OTHER PUBLICATIONS

Vallée-Rai et al., "Soot—a Java Bytecode Optimization Framework," 1999, IBM, p. 1-11.*
Cierniak et al., "Practicing JUDO: Java™ Under Dynamic Optimizations," 2000, ACM, p. 13-26.*
Pominville et al., "A Framework for Optimizing Java Using Attributes," 2000, IBM, p. 1-17.*
Suganuma et al., "A Dynamic Optimization Framework for a Java Just-In-Time Compiler," 2001, ACM, p. 180-194.*

* cited by examiner

*Primary Examiner*—Wei Y Zhen
*Assistant Examiner*—Qing Chen
(74) *Attorney, Agent, or Firm*—Park, Vaughan, Fleming & Dowler LLP

(57) ABSTRACT

One embodiment of the present invention provides a system that reduces the overhead involved in executing a native code method in an application running on a virtual machine. During operation, the system selects a call to a native code method to be optimized within the virtual machine, decompiles at least part of the native code method into an intermediate representation, and obtains an intermediate representation associated with the application. Next, the system combines the intermediate representation for the native code method with the intermediate representation associated with the application running on the virtual machine to form a combined intermediate representation, and generates native code from the combined intermediate representation, wherein the native code generation process optimizes interactions between the application running on the virtual machine and the native code method. A variation on this embodiment involves optimizing callbacks by the native code method into the virtual machine.

18 Claims, 2 Drawing Sheets

REDUCING THE OVERHEAD INVOLVED IN EXECUTING NATIVE CODE IN A VIRTUAL MACHINE THROUGH BINARY REOPTIMIZATION

BACKGROUND

1. Field of the Invention

The present invention relates to the design of virtual machines that execute platform-independent applications within computer systems. More specifically, the present invention relates to a method and an apparatus for reducing the overhead involved in executing native code methods from a platform-independent application running on a virtual machine.

2. Related Art

The rapid proliferation of the Internet has in part been fueled by the development of computer languages, such as the JAVA™ programming language distributed by Sun Microsystems, Inc. of Santa Clara, Calif. The Java programming language allows an application to be compiled into a module containing platform-independent byte codes, which can be distributed across a network of many different computer systems. Any computer system possessing a corresponding platform-independent virtual machine, such as the Java Virtual Machine, is then able to execute the byte codes. In this way, a single form of the application can be easily distributed to and executed by a large number of different computing platforms.

In some cases, it is useful for a platform-independent application to be able to access compiled code written in other languages. To this end, the Java Virtual Machine (JVM) provides the Java Native Interface (JNI), which enables Java applications to access native methods. Through such native methods, Java applications are able to perform low-level system operations, such as I/O operations.

Furthermore, JNI provides an interface through which native code can manipulate heap objects within the JVM in a platform-independent way. For example, native code may call the "GetObjectField" JNI function to fetch a value of a field in a Java heap object. In doing so, the native code does not have know how the Java object is represented in a specific JVM.

Although the JNI facilitates portability of native code across JVM implementations (on a given platform), every call to a native code method through the JNI involves time-consuming indirect calls and associated indirect references. Furthermore, every access to a heap object from the native code method also involves time-consuming indirect calls and associated indirect references. These indirect calls and associated indirect references can introduce a significant amount of overhead, especially for calls to methods that perform very little computational work.

Hence, what is needed is a method and an apparatus that reduces the overhead involved in calling a native code method from a platform-independent application.

SUMMARY

One embodiment of the present invention provides a system that reduces the overhead involved in executing a native code method in an application running on a virtual machine. During operation, the system selects a call to a native code method to be optimized within the virtual machine. The system then decompiles at least part of the native code method into an intermediate representation. The system also obtains an intermediate representation associated with the application running on the virtual machine. Next, the system combines the intermediate representation for the native code method with the intermediate representation associated with the application running on the virtual machine to form a combined intermediate representation. The system then generates native code from the combined intermediate representation, wherein the native code generation process optimizes interactions between the application running on the virtual machine and the native code method.

In a variation on this embodiment, selecting the call to the native code method involves selecting the call based upon the execution frequency of the call, and the overhead involved in performing the call to the native code method as compared against the amount of work performed by the native code method.

In a variation on this embodiment, optimizing interactions between the application running on the virtual machine and the native code method involves optimizing calls to the native code method by the application.

In a variation on this embodiment, optimizing interactions between the application running on the virtual machine and the native code method involves optimizing callbacks by the native code method into the virtual machine. For example, the system can optimize callbacks that access heap objects within the virtual machine.

In a variation on this embodiment, obtaining the intermediate representation associated with the application running on the virtual machine involves recompiling a corresponding portion of the application.

In a variation on this embodiment, obtaining the intermediate representation associated with the application running on the virtual machine involves accessing a previously generated intermediate representation associated with the application running on the virtual machine.

In a variation on this embodiment, the virtual machine is a Java Virtual Machine (JVM) and combining the intermediate representation for the native code method with the intermediate representation associated with the application running on the virtual machine involves integrating calls provided by the Java Native Interface (JNI) into the native code method.

In a variation on this embodiment, prior to decompiling the native code method, the method further comprises setting up a context for the decompilation by: determining a signature of the call to the native code method; and determining a mapping from arguments of the call to corresponding locations in a native application binary interface (ABI).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs). However this does not include computer instruction signals embodied in a transmission medium (with or without a carrier wave upon which the signals are modulated).

Virtual Machine

Figure 1:
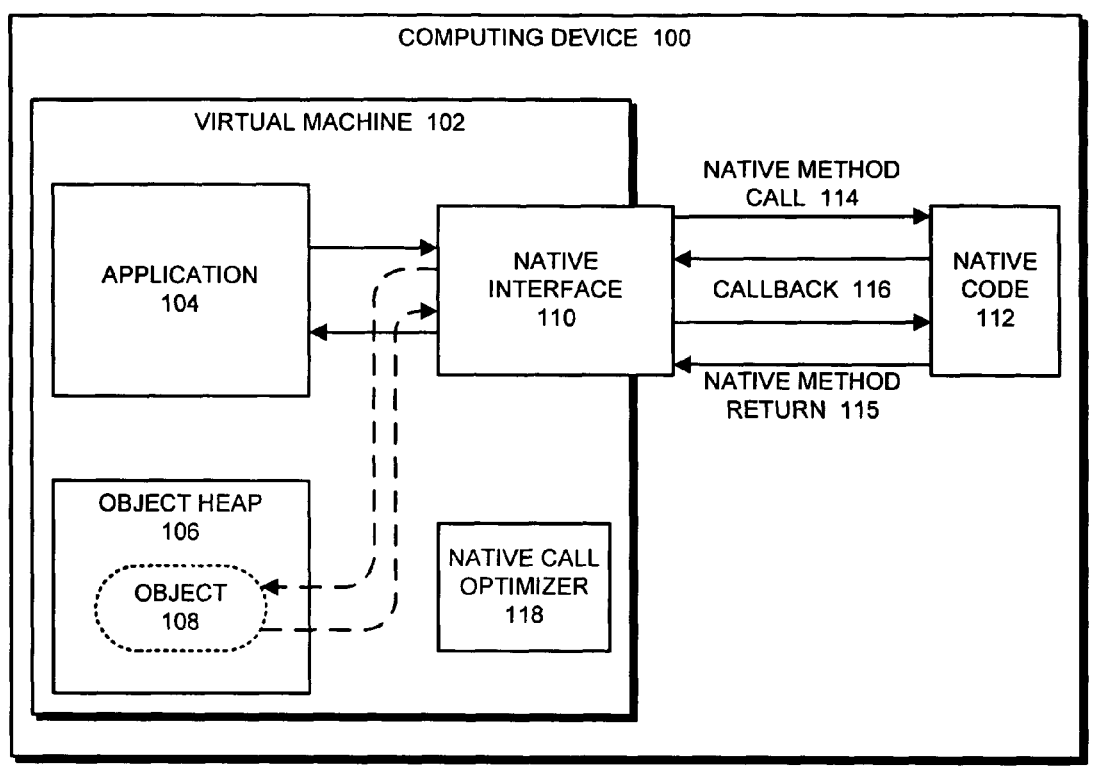
FIG. 1 illustrates a virtual machine in accordance with an embodiment of the present invention.

FIG. 1 illustrates a virtual machine 102 within a computing device 100 in accordance with an embodiment of the present invention. Computing device 100 can include any type of computing device or system including, but not limited to, a mainframe computer system, a server computer system, a personal computer system, a workstation, a laptop computer system, a pocket-sized computer system, a personal organizer or a device controller. Computing device 100 can also include a computing device that is embedded within another device, such as a pager, a cellular telephone, a television, an automobile, or an appliance.

Computing device 100 includes virtual machine 102. Virtual machine 102 can generally include any type of virtual machine that is capable of executing platform-independent code, such as the JAVA VIRTUAL MACHINE™ developed by SUN Microsystems, Inc. of Santa Clara, Calif. (Sun, Sun Microsystems, Java and Java Virtual Machine are trademarks or registered trademarks of Sun Microsystems, Inc. in the United States and other countries.)

Virtual machine 102 can execute a platform-independent application 104. Platform-independent application 104 can include any type of application that can execute on virtual machine 102. In one embodiment of the present invention, virtual machine 102 is a Java virtual machine (JVM) and platform-independent application 104 is made up of platform-independent Java bytecodes (as well as native methods).

Virtual machine 102 also includes object heap 106 for storing objects that are manipulated by platform-independent applications, such as application 104, which execute on virtual machine 102.

Virtual machine 102 additionally provides a native interface 110, such as the Java Native Interface (JNI), which facilitates calls to methods in native code 112 from applications running on virtual machine 102. Note that computing device 100 provides a number of native code methods for performing low-level system functions, such as I/O operations. (These native code methods can be compiled from another programming language, such as the C programming language.)

As is illustrated in FIG. 1, native interface 110 allows application 104 to call a method from within native code 112. In particular, native interface 110 facilitates a native method call 114 from application 104, and a native method return 115 to application 104. Native interface 110 also allows native code 112 to perform a callback 116 to virtual machine 102. As illustrated in FIG. 1, this callback 116 can, for example, access an object 108 within object heap 106.

Virtual machine 102 also includes a native call optimizer 118, which optimizes calls the native code methods and associated callbacks to virtual machine 102 as is discussed in more detail below with reference to FIG. 1.

Process of Optimizing a Call to a Native Code Method

Figure 2:
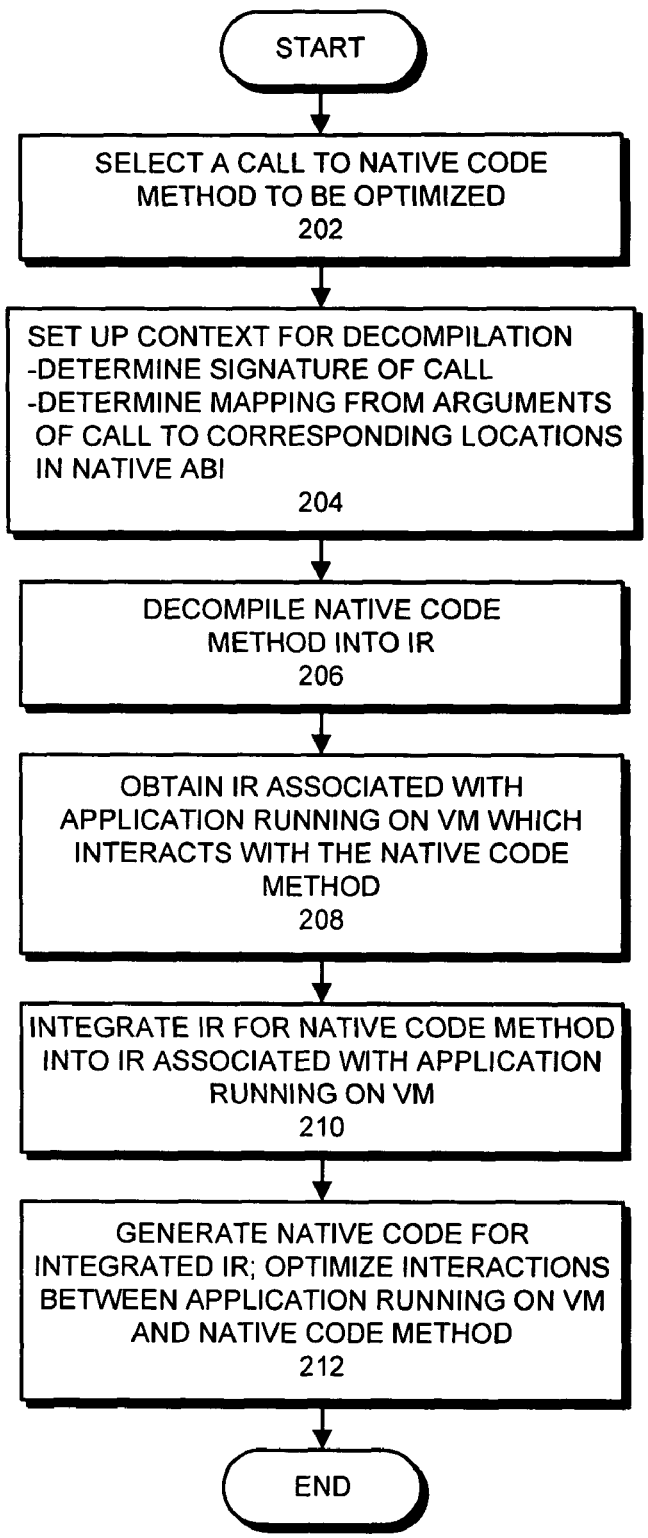
FIG. 2 presents a flow chart illustrating the process of optimizing a call to a native code method from an application running on a virtual machine in accordance with an embodiment of the present invention.

FIG. 2 presents a flow chart illustrating the process of optimizing a call to a native code method from an application running on a virtual machine in accordance with an embodiment of the present invention. The process starts when the system selects a call to a native code method to be optimized (step 202). This selection process can involve examining the execution frequency of the call. (Note that there is Little Benefit in Optimizing Calls that are Made Infrequently.) This execution frequency can be obtained, for example, by instrumenting the boundary of a method to determine how often to the method is invoked from a specific call site.

The selection process can also involve considering the overhead involved in performing the call to the native code method as compared against the amount of work performed by the native code method. For native methods that perform a significant amount of computational work, the overhead involved in performing the call is not significant when compared against the total time spent executing the native method. Calls to such computationally intensive native methods receive little benefit from optimization. On the other hand, calls to native methods that perform very little computational work can benefit greatly from optimization.

Once a call to a native method is selected, the system sets up a context for decompilation (step 204). This can involve determining a signature of the call, and determining a mapping from arguments of the call to corresponding locations in a native application binary interface (ABI).

Next, the system decompiles the selected method into an intermediate representation (IR) (step 206). Note that the term "intermediate representation" as used in this specification can include any intermediate representation of code between the original source code and the final binary executable code for the application. For example, the intermediate representation can include, but is not limited to, modified source code, platform-independent byte codes, assembly code, an intermediate representation for computational operations used within a compiler, or binary code that is not in final executable form.

The system also obtains an intermediate representation, associated with the application running on the virtual machine, which performs calls to native code methods and callbacks into virtual machine 102 (step 208). This can involve recompiling a corresponding portion of application 104 to obtain the intermediate representation, or alternatively, accessing a previously generated intermediate representation associated with application 104 running on the virtual machine 102.

Next, the system integrates IR for the native code method into the IR associated with application 104 running on virtual machine 102 (step 210). This can involve inlining smaller native code methods into call site in application 104, inlining or smaller implementations of native interface methods to perform callbacks into native code 112. Note that inlining generally does not make sense for larger methods.

Finally, the system generates native code from the integrated IR (step 212). During this code generation process, standard compiler optimization techniques are performed to eliminate unnecessary indirect calls and indirect references associated with calls to native methods and related callbacks.

Note during this optimization process, more information is available than when a general dynamic re-optimizer is applied to the same compiled code. For example, the above-described process would know that environment pointers refer only to read-only structures. This additional information can be used to improve the optimization process.

Also note that as with Java compilation the above-described optimization process can be performed adaptively or just-in-time, based upon which calls and/or callbacks are heavily used.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for reducing an overhead involved in executing native code methods in an application running on a virtual machine, comprising:
   - selecting a call to any native code method to be optimized within the virtual machine;
   - decompiling at least part of the native code method for the selected call into an intermediate representation, wherein an intermediate representation includes a set of instruction code which is not in final executable form, wherein decompiling at least the part of the native code method involves setting up a context for a decompilation by determining a signature of the selected call and determining a mapping from arguments of the selected call to corresponding locations in a native application binary interface (ABI);
   - obtaining a previously-generated intermediate representation associated with the application running on the virtual machine which interacts with the native code method for the selected call;
   - integrating the intermediate representation for the native code method for the selected call into the intermediate representation associated with the application running on the virtual machine to form an integrated intermediate representation; and
   - generating a native code from the integrated intermediate representation, wherein generating the native code from the integrated intermediate representation involves optimizing interactions between the application running on the virtual machine and the native code method for the selected call, wherein optimizing the interactions involves optimizing calls from the application to the native code method for the selected call by using additional information from the integrated intermediate representation to reduce a number of indirect calls and indirect references associated with the calls from the application to the native code method for the selected call.

2. The method of claim 1, wherein selecting the call to any native code method involves selecting the call based upon at least one of:
   - an execution frequency of the selected call; and
   - an overhead involved in performing the selected call as compared against an amount of work performed by the native code method for the selected call.

3. The method of claim 1, wherein optimizing interactions between the application running on the virtual machine and the native code method for the selected call involves optimizing callbacks by the native code method for the selected call into the virtual machine.

4. The method of claim 3, wherein optimizing callbacks by the selected native code method for the selected call into the virtual machine involves optimizing callbacks that access heap objects within the virtual machine.

5. The method of claim 3,
   - wherein the virtual machine is a platform-independent virtual machine; and
   - wherein integrating the intermediate representation for the native code method for the selected call with the previously-generated intermediate representation associated with the application running on the virtual machine involves integrating calls provided by an interface for accessing native code into the native code method for the selected call.

6. A computer-readable storage device storing instructions that when executed by a computer cause the computer to perform a method for reducing an overhead involved in executing native code methods in an application running on a virtual machine, the method comprising:
   - selecting a call to any native code method to be optimized within the virtual machine;
   - decompiling at least part of the native code method for the selected call into an intermediate representation, wherein an intermediate representation includes a set of instruction code which is not in final executable form, wherein decompiling at least the part of the native code method involves setting up a context for a decompilation by determining a signature of the selected call and determining a mapping from arguments of the selected call to corresponding locations in a native application binary interface (ABI);
   - obtaining a previously-generated intermediate representation associated with the application running on the virtual machine which interacts with the native code method for the selected call;
   - integrating the intermediate representation for the native code method for the selected call into the intermediate representation associated with the application running on the virtual machine to form an integrated intermediate representation; and
   - generating a native code from the integrated intermediate representation, wherein generating the native code from the integrated intermediate representation involves optimizing interactions between the application running on the virtual machine and the native code method for the selected call, wherein optimizing the interactions involves optimizing calls from the application to the native code method for the selected call by using additional information from the integrated intermediate representation to reduce a number of indirect calls and indirect references associated with the calls from the application to the native code method for the selected call.

7. The computer-readable storage device of claim 6, wherein selecting the call to any native code method involves selecting the call based upon at least one of:
   - an execution frequency of the selected call; and
   - an overhead involved in performing the selected call as compared against an amount of work performed by the native code method for the selected call.

8. The computer-readable storage device of claim 6, wherein optimizing interactions between the application running on the virtual machine and the native code method for the selected call involves optimizing callbacks by the native code method for the selected call into the virtual machine.

9. The computer-readable storage device of claim 8, wherein optimizing callbacks by the native code method for the selected call into the virtual machine involves optimizing callbacks that access heap objects within the virtual machine.

10. The computer-readable storage device of claim 8,
wherein the virtual machine is a platform-independent virtual machine; and
wherein integrating the intermediate representation for the native code method for the selected call with the previously-generated intermediate representation associated with the application running on the virtual machine involves integrating calls provided by an interface for accessing native code into the native code method for the selected call.

11. A method for reducing an overhead involved in executing native code methods in an application running on a virtual machine, comprising:
deciding to optimize a callback by any native code method into the virtual machine;
decompiling at least part of the native code method for the callback into an intermediate representation, wherein an intermediate representation includes a set of instruction code which is not in final executable form, wherein decompiling at least the part of the native code method involves setting up a context for a decompilation by determining a signature of the selected callback and determining a mapping from arguments of the selected callback to corresponding locations in a native application binary interface (ABI);
obtaining a previously-generated intermediate representation associated with the application running on the virtual machine which interacts with the native code method for the callback;
integrating the intermediate representation for the native code method for the callback into the intermediate representation associated with the application running on the virtual machine to form an integrated intermediate representation; and
generating a native code from the integrated intermediate representation, wherein generating the native code from the integrated intermediate representation involves optimizing the callback, wherein optimizing the callback involves optimizing calls from the native code method for the callback to the application by using additional information from the integrated intermediate representation to reduce a number of indirect calls and indirect references associated with the calls from the native code method for the callback to the application.

12. The method of claim 11, wherein generating the native code from the integrated intermediate representation also involves optimizing calls by the application to the native code method for the callback.

13. The method of claim 11, wherein optimizing the callback by any native code method into the virtual machine involves optimizing a callback that accesses a heap object within the virtual machine.

14. The method of claim 11,
wherein the virtual machine is a platform-independent virtual machine; and
wherein integrating the intermediate representation for the native code method for the callback with the previously-generated intermediate representation associated with the application running on the virtual machine involves integrating calls provided by an interface for accessing native code into the native code method for the callback.

15. A computer-readable storage device storing instructions that when executed by a computer cause the computer to perform a method for reducing an overhead involved in executing native code methods in an application running on a virtual machine, the method comprising:
deciding to optimize a callback by any native code method into the virtual machine;
decompiling at least part of the native code method for the callback into an intermediate representation, wherein an intermediate representation includes a set of instruction code which is not in final executable form, wherein decompiling at least the part of the native code method involves setting up a context for a decompilation by determining a signature of the selected callback and determining a mapping from arguments of the selected callback to corresponding locations in a native application binary interface (ABI);
obtaining a previously-generated intermediate representation associated with the application running on the virtual machine which interacts with the native code method for the callback;
integrating the intermediate representation for the native code method for the callback into the intermediate representation associated with the application running on the virtual machine to form an integrated intermediate representation; and
generating a native code from the integrated intermediate representation, wherein generating the native code from the integrated intermediate representation involves optimizing the callback, wherein optimizing the callback involves optimizing calls from the native code method for the callback to the application by using additional information from the integrated intermediate representation to reduce a number of indirect calls and indirect references associated with the calls from the native code method for the callback to the application.

16. The computer-readable storage device of claim 15, wherein generating the native code from the integrated intermediate representation also involves optimizing calls by the application to the native code method for the callback.

17. The computer-readable storage device of claim 15, wherein optimizing the callback by any native code method into the virtual machine involves optimizing a callback that accesses a heap object within the virtual machine.

18. The computer-readable storage device of claim 15,
wherein the virtual machine is a platform-independent virtual machine; and
wherein integrating the intermediate representation for the native code method for the callback with the previously-generated intermediate representation associated with the application running on the virtual machine involves integrating calls provided by an interface for accessing native code into the native code method for the callback.

\* \* \* \* \*